Patented May 6, 1930

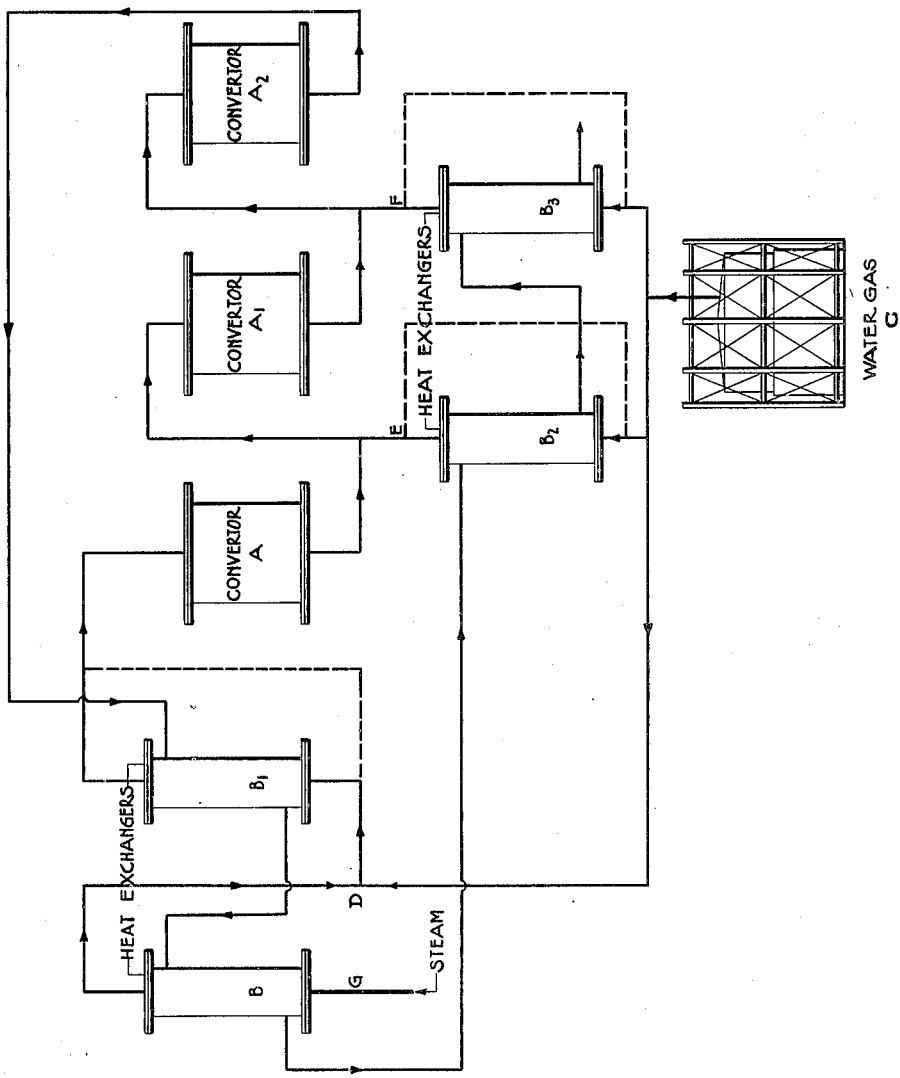

1,756,934

UNITED STATES PATENT OFFICE

JOHN S. BEEKLEY, OF CHARLESTON, WEST VIRGINIA, ASSIGNOR TO DU PONT AMMONIA CORPORATION, OF WILMINGTON, DELAWARE, A CORPORATION OF DELAWARE

PROCESS OF PRODUCING HYDROGEN

Application filed December 19, 1927. Serial No. 240,968.

This invention relates to the manufacture of hydrogen by catalysis from gaseous mixtures of steam and carbon monoxide.

It is known that hydrogen may be produced by the catalytic reaction of steam and carbon monoxide in accordance with the equation $$CO + H_2O = CO_2 + H_2.$$

In the practical manufacture of hydrogen by this method considerable difficulty may be encountered, particularly when employing certain types of catalysts (notably the oxides of the metals of the iron group) due to formation of carbon by decomposition of carbon monoxide according to the reaction $$2CO = CO_2 + C.$$

The deposition of carbon may in time give rise to very serious results through stoppage of the free space between the catalyst particles and even of the gas conduits of the apparatus.

Also in manufacturing hydrogen by this method the gaseous products may contain some methane due to the tendency of the hydrogen, as soon as formed, to react with a portion of the carbon monoxide, thus:

$$CO + 3H_2 = CH_4 + H_2O.$$

Another important consideration in the manufacture of hydrogen from steam and carbon monoxide relates to the control of the operating temperature and particularly to the fact that the reaction involved is an exothermic and reversible one. It is desirable that the products of the reaction should be of a certain and uniform composition, that the minimum amount of steam be employed, and (for both these reasons) that the equilibrium or maximum conversion be attained. If a gaseous product of certain composition is to be obtained, using a predetermined amount of steam, the above considerations require that the gases leaving the reaction zone shall be at a definite temperature. The temperature at which the gases are admitted to the catalyst will depend upon the nature of the catalyst employed, there being for every catalyst a rather definite temperature at which it will initiate the reaction. Obviously the temperature rise that the reaction mixture experiences during its passage through the catalytic body must be no greater than the difference between the temperature at which the gases are to be admitted to the catalyst and the temperature at which they are to be withdrawn therefrom to obtain a gaseous product of the desired composition. This temperature rise is a function of the amount of carbon monoxide that reacts and the thermal capacity of the gases in contact with the catalyst. In many instances, particularly when working to produce a gaseous mixture of relatively high carbon monoxide content, (in which case less steam is used, and the thermal capacity of the gases undergoing reaction is reduced in greater proportion than is the heat evolved by conversion of carbon monoxide to hydrogen), it has been found practically impossible by the prior methods of operation to reconcile the high temperature rise of the reaction mixture with the minimum temperature of activation of the catalyst and the required exit temperature for the gases.

With a view to eliminating these and other difficulties in the practical manufacture of hydrogen it is the object of the present invention to provide an improved process for producing hydrogen by catalysis from mixtures of steam and carbon monoxide.

Other objects and advantages of the invention will be apparent as it is better understood by reference to the following specification in which its details and preferred embodiments are described.

I have found that the operating difficulties hereinbefore referred to may to a large extent be avoided by proceeding in accordance with the following method. All, or substantially all, of the steam that is to be employed is mixed with a fraction of the carbon monoxide-containing gas to be converted thereby, and this mixture is submitted to reaction in contact with a suitable, hot catalyst. The products of the reaction are then cooled, preferably to a temperature corresponding approximately to that at which the gases were first admitted to the catalyst. To the cooled gas an additional portion of carbon monoxide-contaning gas is then added and the mixture is subjected to further reaction in contact with a catalyst. The intermediate cooling referred to is preferably effected largely by the introduction of the additional portion of carbon monoxide-containing gas, perhaps preheated just enough to produce the desired temperature in the resulting mixture.

The number of stages in which the carbon monoxide is introduced as well as the proportion of the total amount of carbon monoxide added in each stage may be varied within wide limits, depending upon the composition of the raw materials and of the gaseous mixture to be produced. Thus, I have found that in using water gas to produce hydrogen containing 6% of carbon monoxide satisfactory results are obtained by adding the carbon monoxide in three steps, in the first of which substantially 30%, in the second about 33%, and in the last about 37% of the total carbon monoxide to be converted is introduced. On the other hand when using the same water gas to produce hydrogen containing 3% of carbon monoxide, the carbon monoxide may be added in two portions, each amounting to about one-half of the total.

The amount of carbon deposited when manufacturing hydrogen in accordance with this process, and even when employing oxides of the iron group as catalysts, is considerably less than that obtained under the same operating conditions in a process in which all the carbon monoxide and steam are introduced simultaneously to the catalyst. Furthermore, the method described tends to minimize the amount of methane present in the gaseous products of the reaction.

An additional important advantage of the process relates to the thermal problem hereinbefore referred to. Whereas by the method of operation previously employed considerable difficulty has been encountered through the temperature rise experienced by the gases while undergoing reaction, the present method of operation makes it possible, while working at or near equilibrium, to produce a hydrogen-containing gas of a wide, controlled range of purity as to carbon monoxide, with an economical consumption of steam, and without the temperature rise of the reacting gases exceeding the value fixed by the minimum temperature of activation of the catalyst and the necessary exit temperature of the gases.

Although the invention is susceptible of variation as to the details of procedure employed, the following example will illustrate the preferred method of carrying out the process, reference being made to the accompanying drawing, in which—

The figure is a diagrammatic representation of a typical arrangement of apparatus adapted for the practice of the invention.

The apparatus includes three converters, A, $A_1$ and $A_2$, in each of which a body of catalyst adapted for the conversion of steam and carbon monoxide to hydrogen is disposed. Tubular heat exchangers, B, $B_1$, $B_2$ and $B_3$, are also provided for warming the gases going to the converters, by heat exchange with the hot gaseous products. Steam, introduced to the system through the conduit G at about 100° C., is heated preliminarily to about 130° C. in the heat exchanger B by means of the hot gaseous products of the reaction passing therethrough. Water gas, from the water gas supply C, is added to the heated steam at D in the ratio of 30 volumes of dry water gas to 125 volumes of steam. (The water gas contains 38.5% carbon monoxide, 49.8% hydrogen, and 5.6% carbon dioxide, the balance consisting substantially of inerts, such as methane and nitrogen.) The mixture of steam and water gas is then heated to about 420° C. in the heat exchanger $B_1$ at the expense of the hot gaseous products and enters the converter A at about 420° C. In A the gaseous mixture, in contact with the catalyst disposed therein, undergoes partial reaction, in the course of which its temperature rises to a final value of about 500° C. On leaving A the gaseous mixture is cooled by addition thereto of a further portion of relatively cool water gas at E. This water gas has been preliminarily warmed in the exchanger $B_2$ by the gaseous reaction products to such an extent that the resulting gaseous mixture enters the second converter $A_1$ at about 420° C. The volume of water gas added is equal to substantially one-half of that originally introduced at D. In the converter $A_1$ the gaseous mixture undergoes further reaction, attaining a temperature of about 500° C. The gaseous products of this reaction are then cooled by the introduction at F of additional water gas, in about the same proportion as at E and preliminarily warmed in the exchanger $B_3$, so that the gaseous mixture entering the converter $A_2$ is at a temperature of about 420° C. The reaction is completed in the converter $A_2$, the gases leaving $A_2$ at a temperature of about 500° C. Thereafter the gaseous products are passed successively through the heat exchangers $B_1$, B, $B_2$ and $B_3$ to warm the gases that are to react, as previously described. The temperatures in the various converters may be regulated by variation of the amount of steam introduced at G and/or by suitably by-passing gas around the heat exchangers through the connections represented in the drawing by dotted lines. The gaseous products of the reaction contain about 36% hydrogen, 16% $CO_2$, 3% carbon monoxide and 42% steam, the balance being inerts, such as nitrogen and methane. The steam may be removed from the products by cooling and the oxides of carbon may be eliminated by one of the known methods.

The heat exchangers are preferably so designed that the process when under way is thermally self-supporting. In starting the reaction heat is added from an external source, by suitable means not shown, to bring the gases to reaction temperature.

The rate of flow of the gases through the converters is preferably fitted to the volume of catalyst therein, so that there is at all times more than enough catalyst in each converter to bring the reacting mixture passing therethrough essentially to equilibrium.

The process may be carried out under atmospheric or higher pressure. It is particularly adapted for the manufacture of hydrogen under increased pressure, however, since the tendencies toward carbon deposition and methane formation, which are corrected by this process, are greater at higher pressures.

Various changes may be made in the method described without departing from the invention or sacrificing any of the advantages thereof.

I claim:

1. The process of producing hydrogen which comprises subjecting steam, together with a portion of the carbon monoxide with which it is ultimately to react, to the action of a heated catalyst, cooling the resulting gaseous mixture, adding further carbon monoxide thereto and subjecting the resulting mixture to further reaction in contact with a heated catalyst.

2. The process of producing hydrogen which comprises subjecting steam, together with a portion of the carbon monoxide with which it is ultimately to react, to the action of a heated catalyst, and thereafter subjecting the resulting gaseous mixture to one or more additional reaction stages in which the gaseous mixture is cooled, carbon monoxide is added thereto and the mixture is subjected to reaction in contact with a heated catalyst.

3. The process of producing hydrogen, which comprises subjecting steam, together with a portion of the carbon monoxide with which it is ultimately to react, to the action of a heated catalyst, and thereafter subjecting the resulting gaseous mixture to one or more additional reaction stages in which the gaseous mixture is cooled, to substantially the temperature at which the reactants were first introduced to the catalyst, carbon monoxide is added thereto, and thereafter the resulting mixture is subjected to reaction in contact with a heated catalyst.

4. The process of producing hydrogen, which comprises subjecting steam, together with a portion of the carbon monoxide with which it is ultimately to react, to the action of a heated catalyst, and thereafter subjecting the resulting gaseous mixture to one or more additional reaction stages in which the gaseous mixture is cooled, by the addition of carbon monoxide, and thereafter the resulting mixture is subjected to reaction in contact with a heated catalyst.

5. The process of producing hydrogen, which comprises subjecting steam, together with a portion of the carbon monoxide with which it is ultimately to react, to the action of a heated catalyst, and thereafter subjecting the resulting gaseous mixture to one or more additional reaction stages in which the gaseous mixture is cooled, carbon monoxide is added thereto and thereafter the resulting mixture is subjected to reaction in contact with a heated catalyst.

6. The process of producing hydrogen, which comprises subjecting steam, together with a portion of the carbon monoxide with which it is ultimately to react, to the action of a heated catalyst, and thereafter subjecting the resulting gaseous mixture to one or more additional reaction stages in which the gaseous mixture is cooled, to substantially the temperature at which the reactants were first introduced to the catalyst, by the addition of carbon monoxide, and thereafter the resulting mixture is subjected to reaction in contact with a heated catalyst.

In testimony whereof I affix my signature.

JOHN S. BEEKLEY.